United States Patent [19]

Stanley et al.

[11] Patent Number: 4,530,849
[45] Date of Patent: Jul. 23, 1985

[54] METHOD OF PRODUCING CORRUGATED CRISPS

[75] Inventors: Haydn T. Stanley, Muldersdrift; Derek J. Drake, Pretoria, both of South Africa

[73] Assignee: Willards Foods Limited, Johannesburg, South Africa

[21] Appl. No.: 583,792

[22] Filed: Mar. 1, 1984

Related U.S. Application Data

[63] Continuation of Ser. No. 247,380, Mar. 25, 1980, abandoned.

[30] Foreign Application Priority Data

Apr. 28, 1980 [ZA] South Africa ............... 80/2546

[51] Int. Cl.³ .................. A21C 3/00; A21D 8/02; A23P 1/00
[52] U.S. Cl. ............... 426/439; 99/353; 425/370; 426/144; 426/503; 426/512
[58] Field of Search ............ 426/144, 438, 439, 440, 426/502, 503, 512, 517, 441; 264/286; 425/336, 371, 394, 396, 363, 370; 99/349, 350, 353

[56] References Cited

U.S. PATENT DOCUMENTS

| | | | |
|---|---|---|---|
| 1,959,956 | 5/1934 | Jackson | 264/286 |
| 2,034,421 | 3/1936 | Rowe et al. | 425/370 |
| 2,905,559 | 9/1959 | Anderson et al. | 426/439 |
| 3,020,162 | 2/1962 | Cunningham et al. | 426/439 |
| 3,168,056 | 2/1965 | Engels | 425/371 X |
| 3,178,494 | 4/1965 | Tisdale | 425/370 X |
| 3,368,902 | 2/1968 | Berg | 426/440 X |

FOREIGN PATENT DOCUMENTS

| | | |
|---|---|---|
| 881821 | 11/1961 | United Kingdom . |
| 891829 | 3/1962 | United Kingdom . |
| 901264 | 7/1962 | United Kingdom . |
| 1032557 | 6/1966 | United Kingdom . |
| 1066045 | 4/1967 | United Kingdom . |
| 1236109 | 6/1971 | United Kingdom . |
| 1353447 | 5/1974 | United Kingdom . |

*Primary Examiner*—Arthur L. Corbin
*Attorney, Agent, or Firm*—Murray Schaffer

[57] ABSTRACT

Method and apparatus for preparing a flat, formable product, such as a piece of milled corn-based product, having a soft, moist, and substantially fiberless consistency, with a corrugated shape. The apparatus comprises a pair of lower rollers, a pair of upper rollers and upper and lower forming elements extending in endless loops between the lower and upper rollers, respectively. The upper runs of the lower forming elements and the lower runs of the upper forming elements are staggered laterally and converge towards one another. Adjacent loops on the lower rollers and adjacent loops on the upper rollers converge towards one another. When the rollers are rotated the upper runs of the lower forming elements and the lower runs of the upper forming elements move forward synchronously. The piece is engaged between the opposed runs and in moving forward with the forming elements is pressed by the forming elements into a corrugated shape. At the same time the portions of the loops which engage the piece move laterally together so that substantially no lateral stretching of the piece occurs. Once the piece has been provided with a corrugated shape, the piece is fried to obtain a corrugated crisp.

2 Claims, 10 Drawing Figures

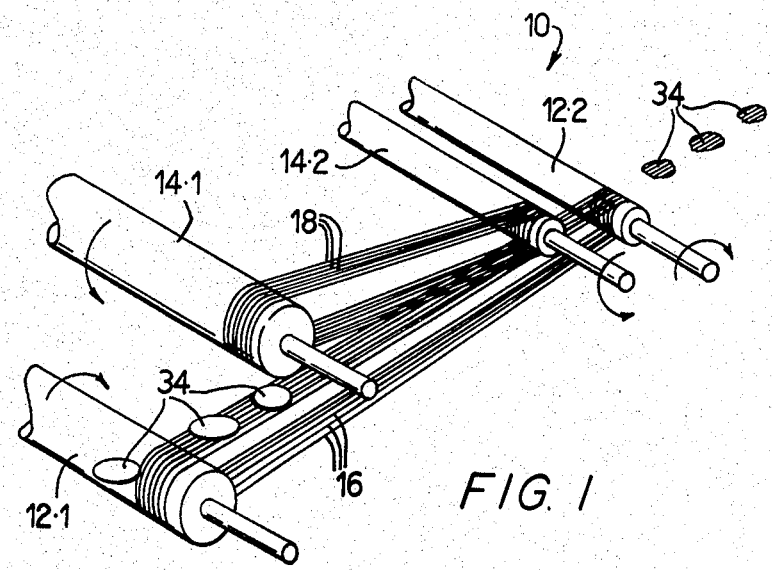
FIG. 1
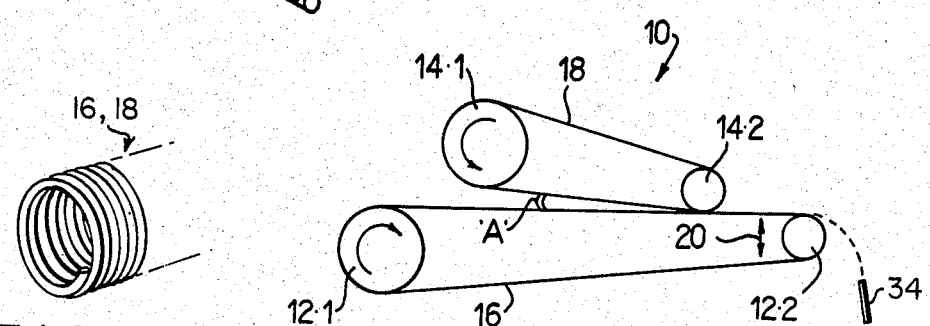
FIG. 10
FIG. 2
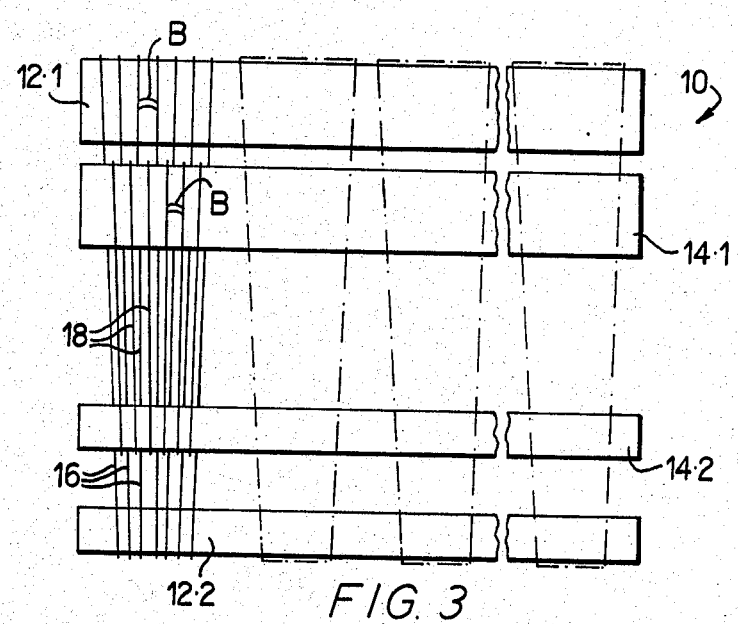
FIG. 3

4,530,849

METHOD OF PRODUCING CORRUGATED CRISPS

BACKGROUND OF THE INVENTION

This invention relates to a method of forming a formable product. It also relates to apparatus for use in such method.

The invention finds particular application in the crisp-making industry in forming a milled corn product referred to as 'masa'. Such corn product has a soft, moist, and substantially fibreless consistency which, after having been shaped into pieces of suitable size, is immersed in hot cooking oil to be fried. The invention could also find application in the forming of products, particularly food products, other than corn-based 'masa' but having a similar consistency.

It has been found that crisps provide a better bite when they are wrinkled or corrugated instead of being flat. It is therefore desirable to provide them with such shape.

Potato crisps have been provided with a corrugated shape by slicing the raw potato with corrugated blades. Attempts to provide corn-based crisps with a corrugated shape have heretofore not met with success.

SUMMARY OF THE INVENTION

It is an object of the present invention to provide a formable product, and in particular corn-based crisps, with a wrinkled or corrugated shape.

According to one aspect of the invention, there is provided a method of providing a flat, formable product with a wrinkled shape, which method comprises engaging the product between suitably shaped, opposed forming means, and, while bringing the forming means together to press the product into a wrinkled shape, causing the forming means to contract in a direction transverse to the direction in which they are brought together.

Where the forming means each comprises a plurality of transversely spaced forming elements, said contraction of the forming means may take place by causing the forming elements to move transversely towards one another.

The degree of contraction of the forming means may be chosen such as to minimise transverse stretching of the product as it is being pressed into said wrinkled shape.

The product may be a food product having a soft, moist, and substantially fibreless consistency, and may, after it has been provided with said wrinkled shape, be fried to provide a crisp having a wrinkled shape. The product may be a milled corn product, i.e. 'masa'.

As mentioned above, 'masa' is a soft, moist, and substantially fibreless corn product. It may be produced by cooking dried maize kernels, adding lime thereto to loosen the husks, steeping the resultant product for 10 to 12 hours in water, washing it to remove the husks, and then milling it. A moisture content of about 55% has been found to be desirable.

According to another aspect of the invention, there is provided a method of producing a wrinkled crisp, which method comprises pressing a flat piece of food product having a soft, moist, and substantially fibreless consistency, into a wrinkled shape in such a manner as to cause substantially no transverse stretching of the product, and thereafter frying the piece.

Further according to the invention, there is provided apparatus for providing a flat formable product with a wrinkled shape, which apparatus comprises a pair of opposed, suitably shaped forming means displaceable towards one another so as to engage the product therebetween and press it into a wrinkled shape, the forming means being contractable in a direction transverse to the direction in which they are displaceable towards one another.

The forming means may each comprise a plurality of laterally spaced, flexible forming elements, each arranged in an endless loop. Displaceability of the forming means towards one another may then be provided by arranging adjacent runs of opposed loops to converge towards one another so that, upon rotation of the endless loops, portions of said forming elements on said adjacent runs are displaced towards one another. Contractability of each forming means may be provided by arranging adjacent loops of the respective forming means to converge towards one another in the direction of convergence of said adjacent runs, so that, upon rotation of the endless loops as aforesaid, portions of the forming elements on adjacent loops are also displaced towards one another.

The apparatus may thus comprise
a lower entry roller;
a lower exit roller spaced forwardly from the lower entry roller;
an upper entry roller spaced upwardly from the lower entry roller;
an upper exit roller spaced forwardly from the upper entry roller;
one or more groups of laterally spaced flexible forming elements arranged in endless loops between the lower entry and exit rollers; and
one or more groups of laterally spaced flexible forming elements arranged in endless loops between the upper entry and exit rollers; adjacent forming elements of each group converging towards one another in the direction of the exit rollers, and the upper runs of the forming elements on the lower entry and exit rollers converging towards the lower runs of the forming elements on the upper entry and exit rollers.

The forming elements on the upper entry and exit rollers may be staggered laterally in relation to the forming elements on the lower entry and exit rollers so that portions of the lower runs of the elements on the upper entry and exit rollers can, during rotation of the loops, move inbetween portions of the upper runs of the forming elements on the lower entry and exit rollers.

The forming elements may be in the form of helically coiled steel wire elements.

BRIEF DESCRIPTION OF THE DRAWINGS

The invention will now be described in more detail, by way of example, with reference to the accompanying drawings.

In the drawings,

FIG. 1 is a perspective view of some of the working parts of apparatus in accordance with the invention;

FIG. 2 is a line diagram showing the apparatus from the side;

FIG. 3 is a line diagram showing the apparatus in broken plan view;

FIG. 10 is a perspective view of part of one of the forming elements of the apparatus.

DESCRIPTION OF THE PREFERRED EMBODIMENT

Figure 4:
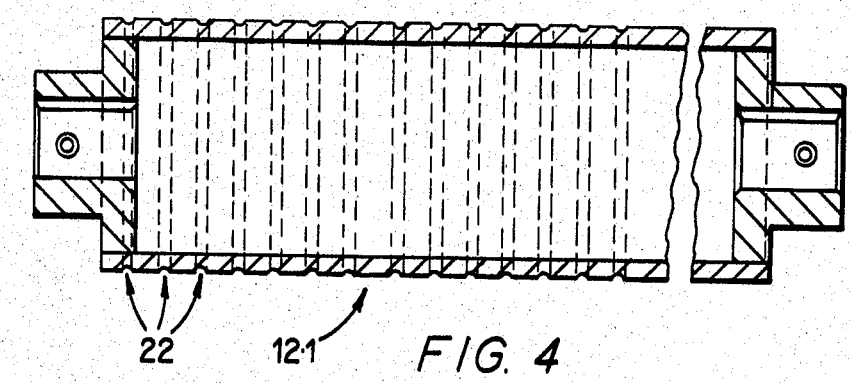
FIG. 4 is a broken longitudinal section of a lower entry roller of the apparatus.

Referring now to FIGS. 1 to 3 of the drawings, reference numeral 10 generally indicates forming apparatus comprising a lower entry roller 12.1, a lower exit roller 12.2 spaced forwardly from the lower entry roller, an upper entry roller 14.1 spaced forwardly from the lower entry roller, an upper exit roller 14.2 spaced forwardly from the upper entry roller, a plurality of flexible forming elements 16 extending in endless loops between the lower rollers 12.1 and 12.2, and a plurality of flexible forming elements 18 extending in endless loops between the upper rollers 14.1 and 14.2. As will be seen in the drawings, the upper entry roller 14.1 is arranged forwardly of the lower entry roller 12.1, whereas the upper exit roller 14.2 is arranged rearwardly of the lower exit roller 12.2. Also, the upper entry roller 14.1 is spaced further upwardly from the upper runs of the lower forming elements 16 than the upper exit roller 14.2. The upper runs of the lower forming elements 18, and the lower runs of the upper forming elements 16 will therefore converge towards one another. The height of either the upper or the lower exit roller 12.2, 14.2 may be adjustable as indicated, for example, by arrow 20 in FIG. 2.

As will be seen in FIG. 10, the forming elements 16 and 18 are in the form of helically coiled steel wire elements.

As will be seen in FIG. 4, the lower entry roller 12.1 has a number of spaced, circumferentially extending grooves 22 therein, each for accommodating one of the lower forming elements 16. The grooves 22 are arranged in groups of seven, there being seven groups, one adjacent the other. It is to be understood, however, that there may be a different number of grooves in each group, and that there may be a different number of groups on the rollers.

Figure 7:
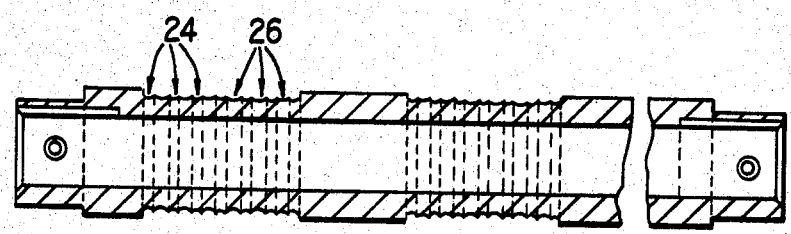
FIG. 7 is a broken longitudinal section of a lower exit roller of the apparatus.

As will be seen in FIG. 7, the lower exit roller 12.2 also has a number of spaced, circumferentially extending grooves therein, here indicated by reference numeral 24. The grooves 24 are also arranged in groups of seven, there being seven groups on the roller. However, as will be seen in the drawing, the spacing between adjacent grooves 24 in each group is less than that between the grooves 22 on the entry roller 12.1. Thus, when the lower forming elements 16 are in position on the rollers 12.1 and 12.2, they will be arranged in groups of seven, adjacent elements in each group converging towards one another in the direction of the exit roller 12.2.

Between adjacent grooves 24, the roller 12.2 is recessed circumferentially, as indicated by reference numeral 26.

Figure 5:
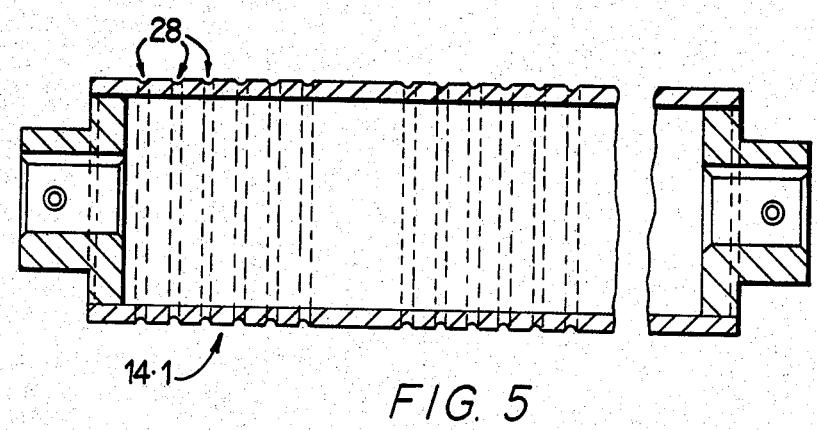
FIG. 5 is a broken longitudinal section of an upper entry roller of the apparatus.
Figure 6:
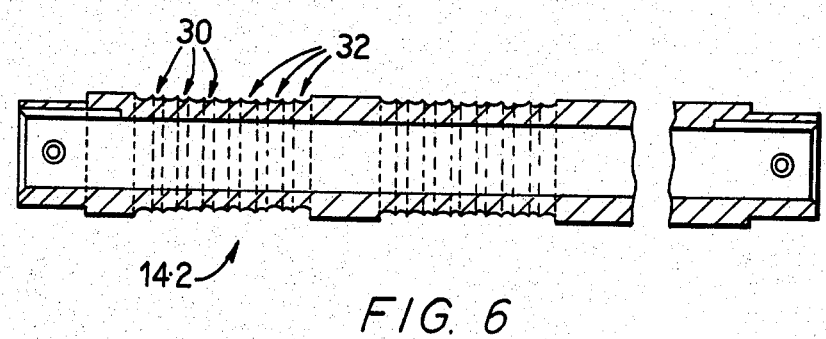
FIG. 6 is a broken longitudinal section of an upper exit roller of the apparatus.

As will be seen in FIGS. 5 and 6, the upper rollers 14.1 and 14.2 have grooves 28 and 30 respectively therein, arranged in seven groups of six. The spacing between the grooves 28 and 30 respectively corresponds to the spacing of the forming elements 16 immediately below the respective rollers. Like in the case of the roller 12.2, the roller 14.2 is provided with circumferentially extending recesses, here indicated by reference numeral 32, between adjacent grooves 30.

The upper forming elements 18 are accommodated in the grooves 28 and 30.

In use, the entry rollers 12.1 and 14.1 are driven so that the upper runs of the lower forming elements 16, and the lower runs of the upper forming elements 18 move forwardly towards the exit rollers 12.2, 14.2 at the same speed, i.e. synchronously.

Figure 8:
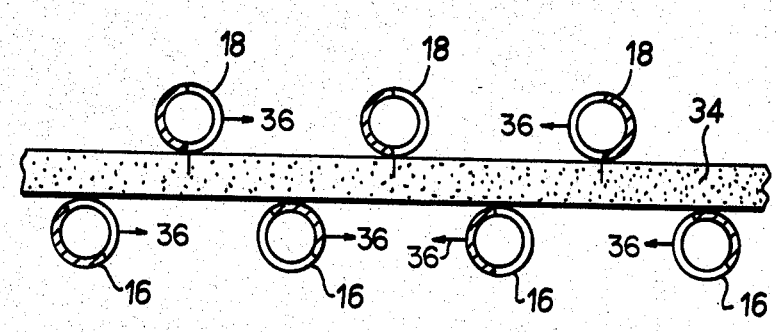
FIGS. 8 and 9 are cross-sections at different longitudinal positions through the apparatus to show its forming action when in operation.

Flat, disc-shaped pieces 34 of corn-based 'masa', just over 2 mm in thickness, are produced by machinery known in the art, and are deposited on the upper runs of the lower forming elements 16. The pieces 34 are transported by the elements 16 towards the exit rollers 12.2, 14.2. As each piece 34 nears the longitudinal position of the upper exit roller 14.2, it is engaged by the upper forming elements 18, as indicated in FIG. 8.

Figure 9:
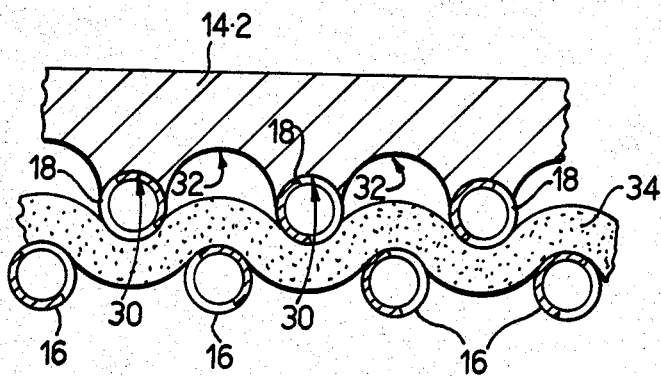

Upon further forward displacement, the converging forming elements 16 and 18 press the piece 34 into a corrugated shape, as indicated in FIG. 9. While being so pressed into a wrinkled shape the forming elements 16, 18 also move together laterally as indicated by arrows 36 in FIG. 8. The angle of convergence A (see FIG. 2) between the adjacent runs of the forming elements 16 and the forming elements 18, and the angle of convergence B (see FIG. 3) between adjacent forming elements 16, 18 in each group, is chosen such that there is substantially no lateral stretching of the 'masa' as the pieces 34 pass through the apparatus. This will ensure that the pieces 34 remain intact.

When the pieces 34 have passed underneath the upper exit roller 14.2 they have the desired corrugated shape. They are carried further forwardly for a short distance on the forming elements 16, up to and over the lower exit roller 12.2, and from there they drop into hot cooking oil where they are fried. The longitudinal wrinkles are effective to stiffen the pieces, ensuring good separation of the pieces from the forming elements 16 as the forming elements 16 pass over the roller 12.2.

From this point onward, the pieces 34 are processed by methods known in the art, until crisps are obtained as an end product.

The recesses 26, 32 are provided to prevent the rollers 12.2, 14.2 from touching the pieces 34 as they pass through the apparatus.

What is claimed is:

1. A method of producing corrugated crisps from a food product having a soft, moist and substantially fiberless consistency and which is plastically deformable when raw, the method comprising:

providing separate flat pieces of the raw food product;

providing a plurality of laterally spaced flexible lower forming elements each being in the form of a longitudinally extending endless loop having an upper and a lower run and having a longitudinal dimension which is substantially greater than that of said pieces;

providing a plurality of laterally spaced flexible upper forming elements each being in the form of a longitudinally extending endless loop having an upper run and a lower run and having a longitudinal dimension which is substantially greater than that of said pieces;

synchronously rotating the lower and upper forming elements, the lower and upper forming elements being arranged so that, upon rotation, the upper runs of the lower forming elements extending in a common plane and the lower runs of the upper forming elements extending in a common plane move synchronously forward from an entry end of the forming elements to an exit end of the forming elements, the upper runs of the lower forming elements converge towards each other from the entry end to the exit end, and the lower runs of the upper forming elements converge towards each other from the entry end to the exit end, and the lower runs of the upper forming elements converge towards the plane of the upper runs of the lower forming elements from the entry end to the exit end to the extent that the lower runs of the upper forming elements enter at least partly into spaces between the upper runs of the lower forming elements, said lower and upper runs being laterally displaced toward one another thereby bringing together the lower runs of the upper forming elements and the upper runs of the lower forming elements:

providing hot cooking oil adjacent the exit end of the forming elements; and depositing said pieces on the upper runs of the lower forming elements at the entry end, conveying said pieces by the lower forming elements toward said exit end in order to engage said pieces with the lower runs of the upper forming elements and form said pieces into corrugated shapes by the entry of the lower runs of the upper forming elements into the spaces between the upper runs of the lower forming elements, selecting the angle by which the upper runs of the lower forming elements and the lower runs of the upper forming elements respectively converge towards each other so that substantially no lateral stretching of the pieces occurs while said pieces are being formed into said corrugated shapes, dropping said corrugated shaped pieces directly from the exit end of the forming elements into the hot cooking oil and thereafter frying said shaped pieces to form corrugated crisps.

2. The method as claimed in claim 1 wherein the product is a milled corn product.

* * * * *